(12) United States Patent
Ye

(10) Patent No.: US 11,306,862 B1
(45) Date of Patent: Apr. 19, 2022

(54) UNIVERSAL SUPPORTING MECHANISM

(71) Applicant: Xiaohui Ye, Ningbo (CN)

(72) Inventor: Xiaohui Ye, Ningbo (CN)

(*) Notice: Subject to any disclaimer, the term of this patent is extended or adjusted under 35 U.S.C. 154(b) by 0 days.

(21) Appl. No.: 17/324,132

(22) Filed: May 19, 2021

(30) Foreign Application Priority Data

Jan. 6, 2021 (CN) .......................... 2021200529896

(51) Int. Cl.
*F16M 11/14* (2006.01)
*F41A 23/10* (2006.01)

(52) U.S. Cl.
CPC ............ *F16M 11/14* (2013.01); *F41A 23/10* (2013.01)

(58) Field of Classification Search
CPC ........ F16M 11/14; F16M 11/06; F16M 11/08; F16M 11/10; F16M 11/12; F16M 2200/022; F41A 23/10; F41A 23/14; F16C 11/0695; F16C 11/0609; F16C 11/106; F16C 11/06; Y10T 403/32639; Y10T 403/32655; Y10T 403/32672; Y10T 403/32311; Y10T 403/32631; Y10T 403/32704; Y10T 403/32622; G03B 17/561
USPC .............................. 248/181.1–181.3, 288.51
See application file for complete search history.

(56) References Cited

U.S. PATENT DOCUMENTS

| | | | | |
|---|---|---|---|---|
| 86,173 A * | 1/1869 | Maynard | ............... | F16C 11/106 403/123 |
| 2,496,986 A * | 2/1950 | Coutant | ............... | F16M 11/16 248/168 |
| 2,571,443 A * | 10/1951 | Hair | ............... | F16M 13/027 248/397 |
| 4,157,876 A * | 6/1979 | DiGiulio | ............... | A61F 5/0193 403/123 |
| 5,078,355 A * | 1/1992 | Fujimoto | ............... | F16M 11/10 248/183.2 |
| 5,195,707 A * | 3/1993 | Ignatuk | ............... | F16M 11/14 248/179.1 |
| 5,404,682 A * | 4/1995 | West | ............... | A47G 29/1216 248/183.1 |
| 6,017,010 A * | 1/2000 | Cui | ............... | F16C 11/106 248/181.1 |
| 7,241,069 B2 * | 7/2007 | Richter | ............... | F16C 11/0661 248/288.31 |
| 7,364,125 B2 * | 4/2008 | Speggiorin | ............... | F16M 11/14 248/181.1 |
| 10,626,912 B2 * | 4/2020 | Karai | ............... | F16C 11/106 |
| 2005/0119656 A1 * | 6/2005 | Ferrante | ............... | A61B 90/57 606/59 |
| 2005/0151036 A1 * | 7/2005 | Speggiorin | ............... | F16M 11/32 248/177.1 |
| 2006/0175501 A1 * | 8/2006 | Richter | ............... | F16C 11/0661 248/288.31 |
| 2007/0152115 A1 * | 7/2007 | Chou | ............... | F16M 11/242 248/181.1 |

(Continued)

*Primary Examiner* — Ingrid M Weinhold

(57) ABSTRACT

The disclosure discloses a universal supporting mechanism, comprising a lifting platform for fixing lifting equipment and a connecting seat, and further comprising a universal ball head fixedly connected with the lifting platform, with the universal ball head movably connected with the connecting seat via a connector. The disclosure does not need to be adjusted separately by two or more angle adjustment mechanisms, the angle adjustment can be achieved in one step, the structure is simple, and the application range is wide.

7 Claims, 3 Drawing Sheets

(56) References Cited

U.S. PATENT DOCUMENTS

2016/0076583 A1* 3/2016 Karai ............... F16C 11/06
258/278.1

* cited by examiner

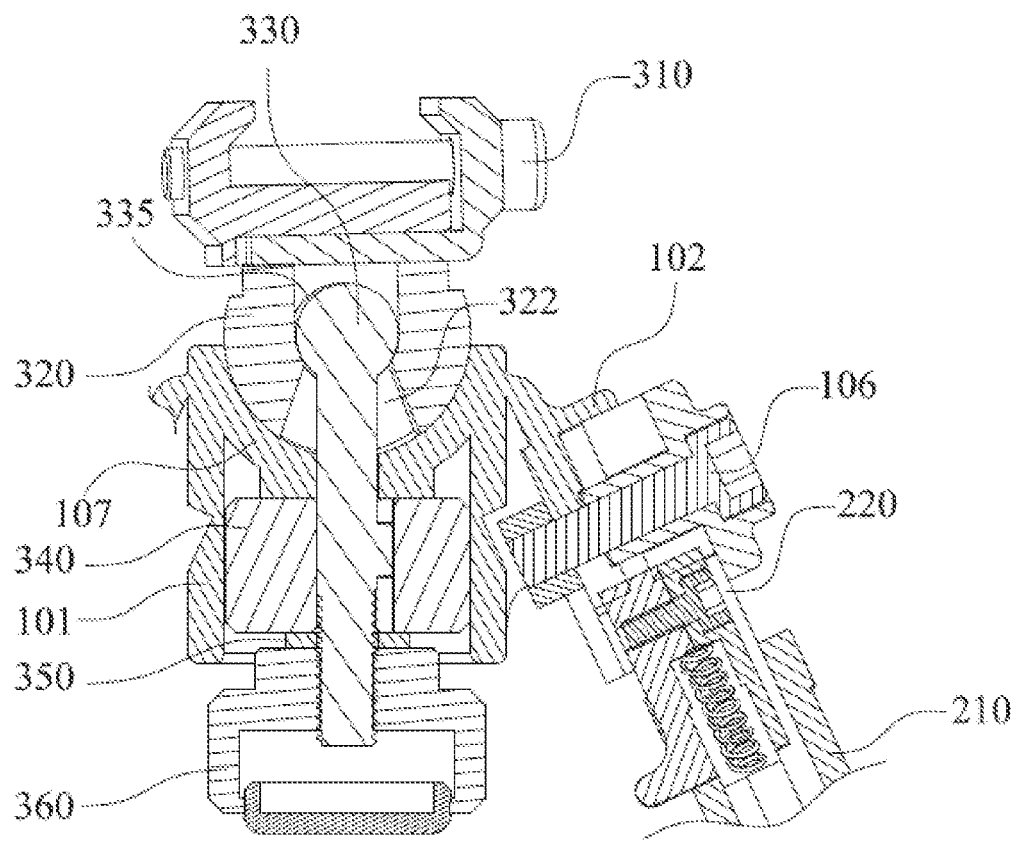
FIG. 2
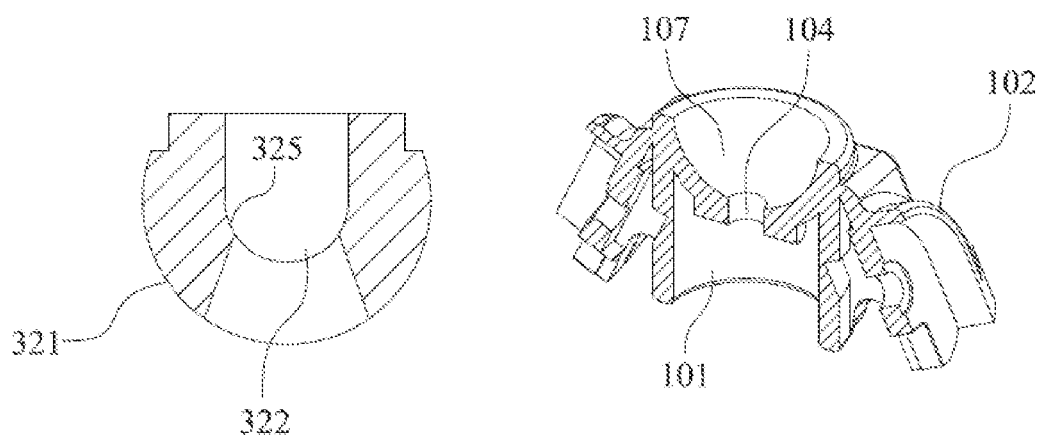
FIG. 3
FIG. 4

UNIVERSAL SUPPORTING MECHANISM

TECHNICAL FIELD

The disclosure relates to a universal supporting mechanism, in particular to a universal supporting mechanism applied to a gunstock.

BACKGROUND ART

A gunstock is also called a gunstock holder, a barrel holder, a firearm tripod, etc. Similar structures are also used for certain equipment that needs to be easily placed on different locations on the ground and needs to be supported, such as small photographic equipment and measuring equipment. In order to adapt to different application environments, the part of the gunstock used to lift the barrel should be flexible for angle adjustment.

Chinese utility model patent with publication number CN211503828U discloses a sniper rifle shooting bracket, which is clamped from both sides of the barrel by a moving splint, and the different angles relative to the initial position are adjusted by threaded rods located at both ends of the moving splint. However, the angle can only be adjusted in the horizontal direction, which cannot meet the needs of elevation angle or depression angle adjustment.

Chinese invention patent application with publication number CN110100147A discloses a firearm bipod, which realizes vertical (rotating in the horizontal plane) angle adjustment and normal (rotating in the vertical plane) angle adjustment through two connected assemblies. However, it still fails to solve the problem of horizontal adjustment, and the cooperation and assembling of the two assemblies still need to be realized through proper connection, and the structure is relatively complicated.

SUMMARY OF THE DISCLOSURE

The disclosure provides a universal supporting mechanism with a simple structure and capable of freely and flexibly adjusting the angle in a three-dimensional direction, so as to solve the defects of limited angle adjustment range and complex structure in the prior art.

The technical solutions adopted by the disclosure to solve the technical problems are as follows.

A universal supporting mechanism comprises a lifting platform for fixing lifting equipment and a connecting seat, and further comprises a universal ball head fixedly connected with the lifting platform, with the universal ball head movably connected with the connecting seat via a connector.

Further, the connecting seat has a recess, the recess has a first through hole, the universal ball head has a second through hole, and the connector passes through the second through hole and the first through hole in sequence and holds the universal ball head at a connection between the connector and the second through hole.

Further, the connector has a central shaft, a first end of the central shaft has a limiting portion, and the limiting portion holds the universal ball head at a connection between the limiting portion and the second through hole, and the universal ball head is able to rotate about an axis of the central shaft within a range of 360 degrees in a horizontal direction relative to the connecting seat.

Further, the limiting portion is a cylinder, a portion of the second through hole that contacts the limiting portion has a curved surface, and the curved surface forms a surface contact with a side surface of the cylinder of the limiting portion.

Further, the limiting portion is a sphere, and a diameter of the limiting portion is larger than a diameter of the second through hole.

Further, a middle part of the central shaft has a positioning protrusion, which is inserted and positioned cooperatively with a groove on a fixing member located below the recess.

Further, the fixing member is tightly fitted with an inner wall of the connecting seat.

Further, a second end of the central shaft is connected with an adjusting knob.

Further, an outer surface of the universal ball head is in surface contact with an inner surface of the recess.

Further, an outer surface of the universal ball head and an inner surface of the recess form a point contact or a line contact.

Compared with the prior art, the disclosure has the advantages that it does not need to be adjusted separately by two or more angle adjustment mechanisms, the angle adjustment can be achieved in one step, the structure is simple, and the application range is wide.

BRIEF DESCRIPTION OF THE DRAWINGS

FIG. 2 is a schematic cross-sectional diagram of a partial structure of the gunstock of FIG. 1;

FIG. 3 is a structural schematic cross-sectional diagram of a universal ball head of the universal supporting mechanism of the present disclosure;

FIG. 4 is a structural schematic cross-sectional diagram of a connecting seat of the universal supporting mechanism of the present disclosure.

DETAILED DESCRIPTION OF THE DISCLOSURE

The disclosure will be further described in detail below in conjunction with the embodiments of the drawings.

Figure 1:
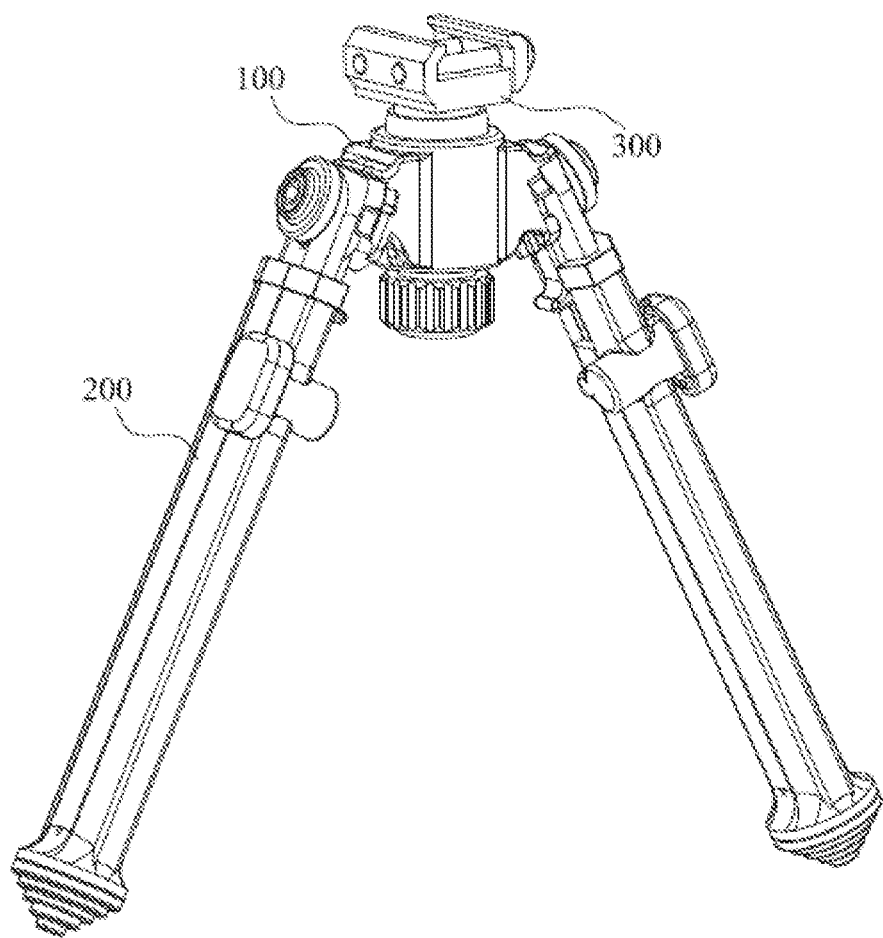
FIG. 1 is a schematic diagram of an overall structure of a gunstock with a universal supporting mechanism of the present disclosure.
Figure 5:
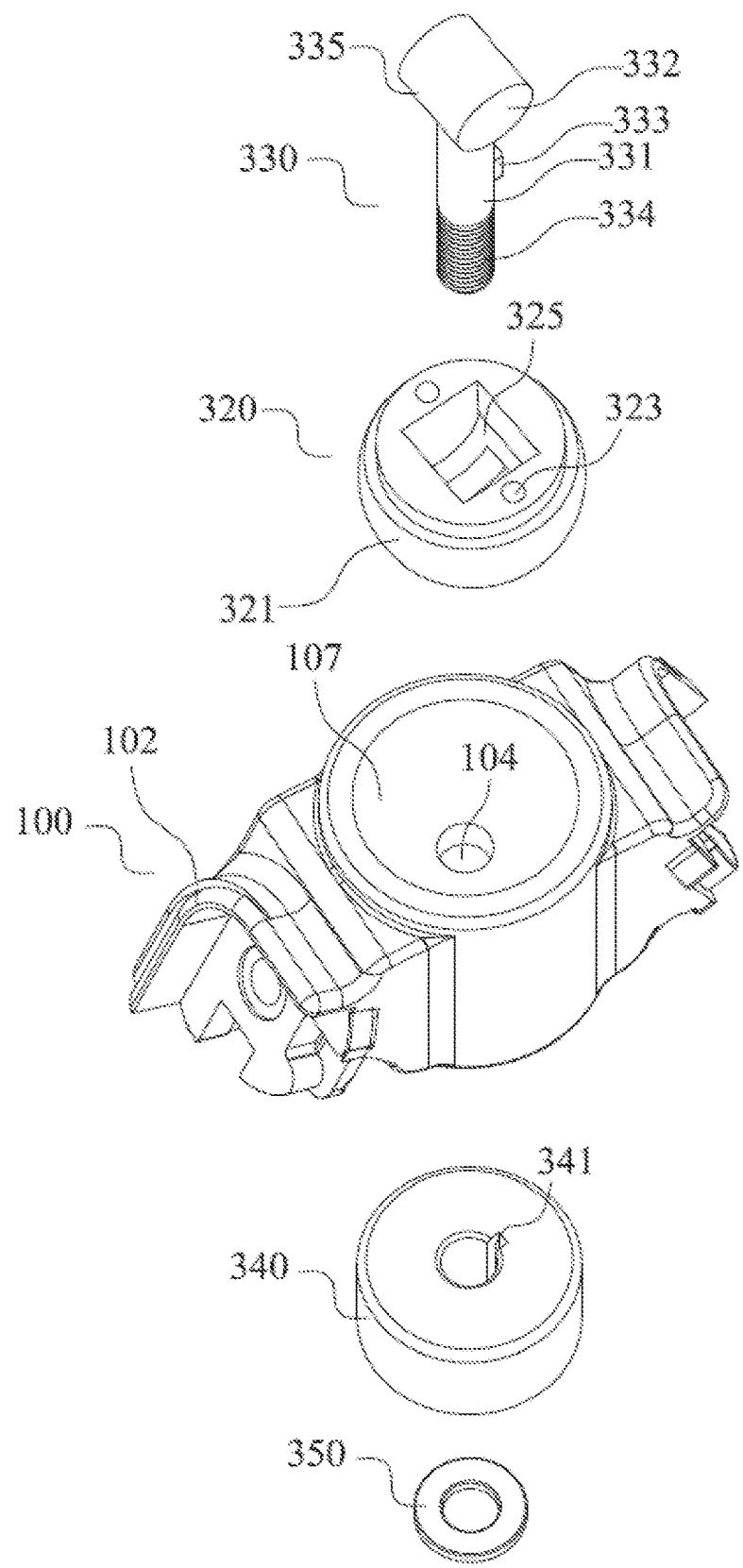
FIG. 5 is an exploded diagram of the universal supporting mechanism of the present disclosure.

With reference to FIGS. 1-5, a gunstock with a universal supporting mechanism of the present disclosure includes a connecting seat 100, a universal supporting mechanism 300 movably connected with the connecting seat 100, and a supporting leg 200 connected with the connecting seat 100. The universal supporting mechanism 300 includes a lifting platform 310 with adjustable width to adapt to gun barrels of different diameters (which is the prior art and will not be described in this application), a universal ball head 320 fixedly connected with the lifting platform 310, and a connector 330 for movably connecting the universal ball head 320 with the connecting seat 100. In one embodiment, a top of the universal ball head 320 has a connecting hole 323, which can be fixedly connected with the lifting platform 310 by means of riveting, threaded connection, or the like.

The connecting seat 100 has a recess 107. An inner surface of the recess 107 is a partial spherical surface. An outer surface 321 of the universal ball head 320 matches the inner surface of the recess 107, and can be a spherical surface, a partial spherical surface, or other curved surfaces that can be attached to the spherical surface. Without considering the degree of freedom of rotation of the universal ball head 320, the universal ball head 320 can be of any shape, and its outer surface 321 may not even contact the inner surface of the recess 107, that is to say, the universal ball head 320 serves as a support of the lifting platform 310 and only needs to be capable of three-dimensional rotation without departing from the connector 330, and does not have to be in contact with or even match with the inner surface of the recess 107, but this is not the best embodiment. When the universal ball head 320 rotates, the outer surface 321 of the universal ball head 320 forms a surface contact with the inner surface of the recess 107, which can disperse the downward pressure from the gun barrel and the user exerted by the lifting platform 310 to the greatest extent, and provide uniform and stable support when the universal ball head 320 rotates freely. Of course, in some embodiments, the outer surface 321 of the universal ball head 320 and the inner surface of the recess 107 may also form or partially form a line contact or a point contact. In some embodiments, the outer surface 321 of the universal ball head 320 and the inner surface of the recess 107 can be made of materials with appropriate resistance. In other embodiments, structures or materials for adjusting resistance can also be provided or added to adapt to different resistance requirements in use.

In one embodiment, the connector 330 has a central shaft 331, a first end of the central shaft 331 has a limiting portion 332, the recess 107 is provided with a first through hole 104 that allows the central shaft 331 to pass through, and the universal ball head 320 is provided with a second through hole 322 that allows the central shaft 331 to pass through. A diameter of the limiting portion 332 is larger than a diameter of the second through hole 322. Therefore, the limiting portion 332 cannot pass through the second through hole 322. In this embodiment, the universal ball head 320 can rotate about an axis of the central shaft 331 within a range of 360 degrees in a horizontal direction relative to the connecting seat 100. The central shaft 331 of the connector 330 passes through the second through hole 322 and the first through hole 104 in sequence. A second end 334 of the central shaft 331 is connected with the adjusting knob 360, and the limiting portion 332 holds the universal ball head 320 at a connection between the limiting portion 332 and the second through hole 322, a lower section of the second through hole 322 is a fan-shaped structure, and the universal ball head 320 will make three-dimensional rotation (swing) around the limiting portion 332 within the range of the fan-shaped structure when in use. In one embodiment, the limiting portion 332 is a cylinder, and a part where the second through hole 322 of the universal ball head 320 contacts the limiting portion 332 has an curved surface 325, and the curved surface 325 and a cylindrical side 335 surface of the limiting portion 332 form a surface contact, and the limiting portion 332 can roll a certain distance (within the range of the fan-shaped structure) on the curved surface 325. That is, compared with the limiting portion 332 of any shape, in this embodiment, the universal ball head 320 can make a more stable normal rotation relative to the limiting portion 332. In another embodiment, the limiting portion 332 is a sphere. In other embodiments, the limiting portion 332 may also be rotatably connected with the universal ball head 320 in other ways. As mentioned above, in addition to the outer surface 321 of the universal ball head 320 and the inner surface of the recess 107, the limiting portion 332 can also be made of materials with appropriate resistance, that is, the components related to rotation can be made according to different needs by choosing the appropriate materials and structures.

In one embodiment, the middle part of the central shaft 331 has a positioning protrusion 333, which is inserted and positioned cooperatively with the groove 341 on the fixing member 340 located under the recess 107. The fixing member 340 is tightly fitted with an inner wall 101 of the connecting seat 100 to make the central shaft 331 not swing, and the supporting accuracy is improved. In one embodiment, a gasket 350 is provided between the adjusting knob 360 and the fixing member 340 to enhance the connection stability.

The connecting seat 100 has a side connecting portion 102, and the supporting leg 200 and the side connecting portion 102 are rotatably connected by a rotating shaft 106. The supporting leg 200 includes an outer sleeve 210 and an inner sleeve 220 that are slidably connected. In one embodiment, the inner sleeve 220 is rotatably connected with the side connecting portion 102 and locked by a rotation control mechanism.

When using the universal supporting mechanism of the present disclosure, the gun barrel is fixed on the lifting platform 310, and the gun barrel is rotated in the direction that needs to be adjusted. The universal ball head 320 will then flexibly rotate, and it can be rotated to the required level at one time.

When applied to other similar equipment brackets that need to be supported, such as brackets for photographic equipment or surveying and mapping equipment, the corresponding lifting platform can be used in conjunction.

What is claimed is:

1. A universal supporting mechanism for fixing a gun barrel, comprising:
    a lifting platform having a universal ball head fixedly connected with the lifting platform, with the universal ball head movably connected with a connecting seat via a connector;
    wherein the connecting seat has a recess, the recess has a first through hole, the universal ball head has a second through hole, and the connector passes through the second through hole and the first through hole in sequence and holds the universal ball head at a connection between the connector and the second through hole;
    wherein the connector has a central shaft, a first end of the central shaft has a limiting portion;
    wherein the limiting portion is a cylinder, a portion of the second through hole that contacts the limiting portion has a curved surface, and the curved surface forms a surface contact with a side surface of the cylinder of the limiting portion;
    wherein a middle part of the central shaft has a positioning protrusion, which is inserted and positioned cooperatively within a groove on a fixing member located below the recess; the fixing member is sleeved in the connecting seat.

2. The universal supporting mechanism according to claim 1, wherein the limiting portion holds the universal ball head at a connection between the limiting portion and the second through hole.

3. The universal supporting mechanism according to claim 2, wherein an outer surface of the universal ball head is in surface contact with an inner surface of the recess.

4. The universal supporting mechanism according to claim 1, wherein an outer surface of the fixing member abuts against an inner wall of the connecting seat.

5. The universal supporting mechanism according to claim 4, wherein an outer surface of the universal ball head is in surface contact with an inner surface of the recess.

6. The universal supporting mechanism according to claim 1, wherein a second end of the central shaft is connected with an adjusting knob.

7. The universal supporting mechanism according to claim 1, wherein an outer surface of the universal ball head is in surface contact with an inner surface of the recess.

* * * * *